Dec. 8, 1959 I. W. EISENBERG ET AL 2,916,698
PROBE
Filed July 30, 1956
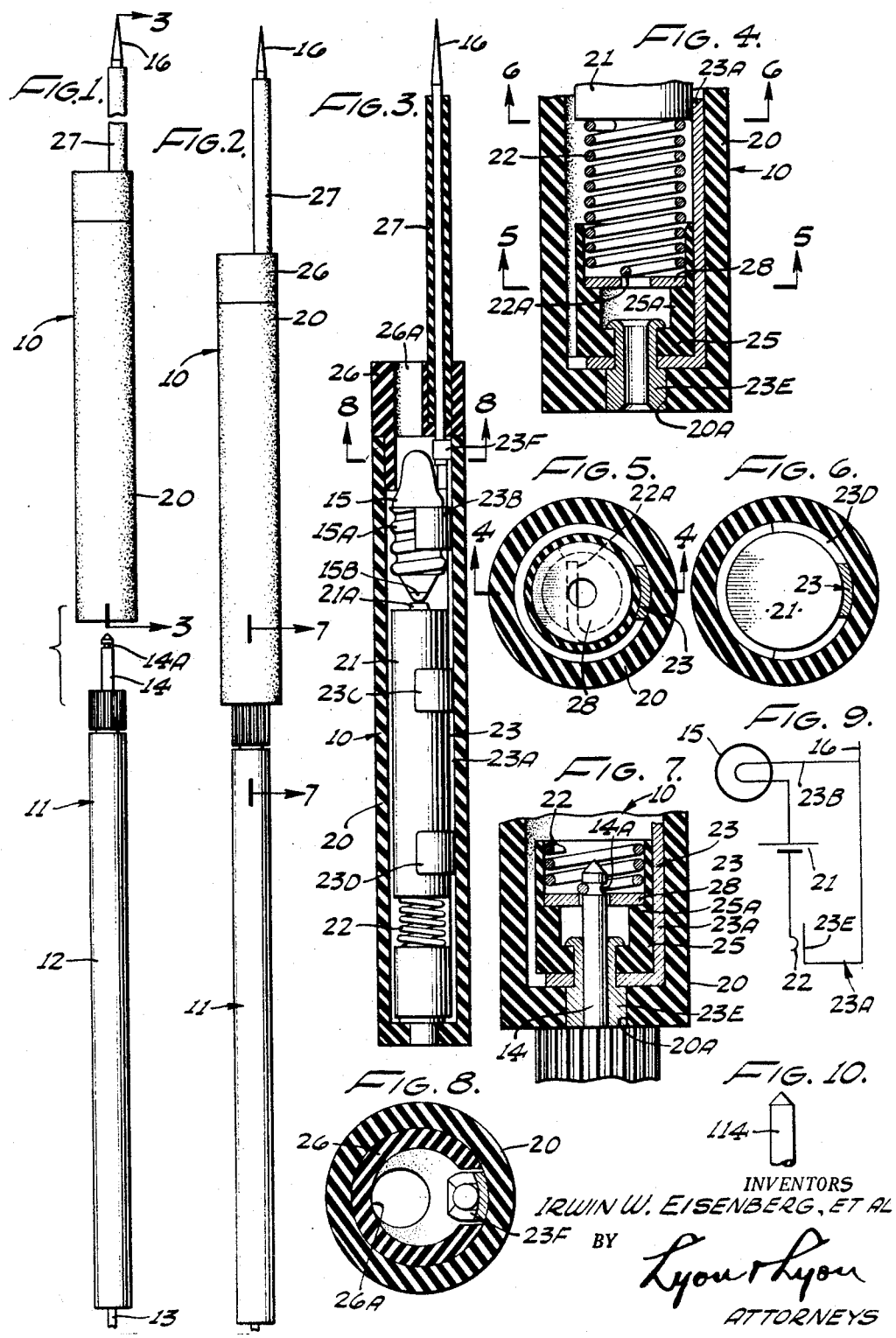
INVENTORS
IRWIN W. EISENBERG, ET AL
BY
Lyon & Lyon
ATTORNEYS

United States Patent Office 2,916,698
Patented Dec. 8, 1959

2,916,698
PROBE

Irwin Weinman Eisenberg, Pasadena, Edmond W. Carlson, Arcadia, Kenneth Timothy Alfred Love, Azusa, Bernie H. Stadler, Puente, Steve J. Costantino, Covina, Leo W. Trammel, Los Angeles, and Clarence Heck Dibble, Pasadena, Calif., assignors to Phaostron Instrument and Electronic Company, South Pasadena, Calif., a corporation of California Application July 30, 1956, Serial No. 600,939

8 Claims. (Cl. 324—72.5)

The present invention relates to an arrangement for use with electrical testing leads or probes of the type commonly associated with testing equipment such as, for example, volt, ohm milliammeter, vacuum tube volt meter, oscilloscopes, and the like.

In general, the present arrangement is in the form of an adapter which provides an extension for existing test leads, and an important feature of the same is that it provides a source of illumination directed onto the particular spot in the circuitry being tested.

As is well known, electrical apparatus such as radio, radar and audio equipment is usually wired in a compact form, and the physical layout involves usually a jumble of interconnected resistances, condensers, coils, tube sockets, tie points, and the like. Some of such components may, indeed, be crammed in locations that are not conveniently visible due to the shape of the chassis and overlying components. Thus, persons confronted with the task of checking out, testing or servicing electronic equipment of this nature have found it inconvenient and sometimes confusing in placing a test probe at critical points in the electrical circuitry.

The use of the present arrangement obviates these difficulties in that it illuminates the point in the circuitry under investigation and forms a convenient extension when, as is often the case, the chassis is a "deep" chassis.

A general object, therefore, of the present invention is to provide a device which facilitates the testing of electrical equipment.

Another general object of the present invention is to provide a device which is usable with existing test leads for facilitating the testing of electronic equipment.

A specific object of the present invention is to provide an illuminated test probe.

Another specific object of the present invention is to provide an extension for existing test probes.

Another specific object of the present invention is to provide a test probe which incorporates a source of illumination that is automatically energized in use of the same.

Another specific object of the present invention is to provide an improved test probe which not only provides a source of illumination but also provides a convenient extension.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1 is a view in elevation of an arrangement embodying features of the present invention shown in detached relationship with respect to the probe of a conventional test lead.

Figure 2 is a plan view showing the elements illustrated in Figure 1 in assembled relationship.

Figure 3 is a sectional view taken generally on the line 3—3 of Figure 1.

Figure 4 is a sectional view taken on the line 4—4 of Figure 5.

Figure 5 is a sectional view taken substantially on the line 5—5 of Figure 4.

Figure 6 is a sectional view taken substantially on the line 6—6 of Figure 4.

Figure 7 is a sectional view taken substantially on the line 7—7 of Figure 2.

Figure 8 is a sectional view taken substantially on the line 8—8 of Figure 3.

Figure 9 illustrates, in schematic form, the electrical circuitry of the device shown in Figure 3.

Figure 10 illustrates another form of conventional probe tip which may be used in conjunction with the device illustrated in Figure 3.

The device 10 incorporating features of the present invention may be quickly attached to and detached from a conventional test probe 11 to form an insulated extension of the test probe 11.

The test probe 11, as illustrated in Figures 1 and 10, is of conventional construction and involves generally an insulated sleeve 12 through which a flexible insulated conductor 13 extends, such insulated conductor being electrically connected to the metal contact pin 14.

The test pin 14 may either be a cylindrical pin with a rounded end, or as illustrated in Figure 1, the contact pin may be provided with an annular groove portion 14A.

The device 10 is adapted to seat the contact pin 14 (Figure 1) so as to not only mechanically secure the two elements 10 and 11 together but also to provide an electrical connection with elements in the device 10. Such connection completes an energizing circuit for the lamp bulb 15 and serves also to connect the contact pin 14 to the contact pin 16. The contact pin 14 may have an annular groove 14A or be a straight contact pin 114, as shown in Figure 10.

The device 10 comprises a barrel 20 of insulating material serving to house the lamp bulb 15, battery 21, spring 22, and a specially fabricated conducting strip assembly 23. The barrel 20 is closed at one end by an apertured plug 26 of insulating material, the other end of the barrel 20 being centrally apertured at 20A to receive a portion of the assembly 23.

The assembly 23 comprises generally a metallic strip 23A which extends substantially the full length of the barrel 20 and which has formed integrally thereto the three spaced spring clips 23B, 23C and 23D. The spring clip 23B releaseably retains a standard lamp bulb 15 and provides electrical connection with the metallic screw-threaded base 15A of the bulb 15. The other two spring clips 23C and 23D releaseably secure the battery 21 and engage the outer cylindrical insulated portion of the battery 21.

The assembly 23 includes also the metallic socket 23E in the form of a rivet which passes through an apertured portion of the bent end of the metallic strip 23A and also through a specially formed ferrule 25 of insulating material, the ferrule 25 being secured to the bent end of the strip 23A by the metallic socket 23E.

The socket 23E is snugly received within the barrel apertured portion 20A and centrally maintained thereby.

The ferrule 25 is provided with an internal annular shoulder 25A which seats the metallic washer 28. The washer 28 provides a seat for one end of the coil compression spring 22, and the other end of the spring 22 bearing against the metallic end of the battery 21, so that the other contact 21A of the battery is pressed into good electrical contact with the insulated lamp bulb contact 15B. The assembly 23 includes also a conducting cylindrical portion 23F formed integrally with the strip 23A and providing a mechanical and electrical connection to the inner end of the contact pin 16.

The contact pin 16 passes through plug 26 and its extended portion is covered with the sleeve 27 of insulating material. The plug 26 is provided also with the apertured portion 26A to provide a light passage serving to direct light from the lamp 15 in the general direction of the tip of the contact pin 16.

The spring 22 is of special construction for accomplishing both mechanical and electrical connection to the end of the contact pin 14. For this purpose the spring 22, comprising a plurality of convolutions of spring wire, terminates with a portion 22A. As seen in Figures 4 and 5, the spring portion 22A extends inwardly in a generally radial direction but is off-centered with respect to the central apertured portion of the washer 28 and the centrally apertured portion of the socket 23E. However, a portion of the inwardly bent spring end 22A overlies the centrally aperture portion of the washer 26 so that the spring end 22A is contacted by the inner end of the contact pin 14 when and as the same is inserted in position illustrated in Figure 7.

When and as such spring end 22A is engaged by the contact pin 14 in the process of assembling the two elements 10 and 11 together, such spring end 22A is cammed in the radial direction by the pin 14 so as to achieve a resilient connection between the spring 22 and the contact pin 14. In other words, the spring 22 is distorted somewhat by the pin 14, and this distortion is used to advantage in providing both a mechanical and electrical connection. Thus, the spring end 22A is resiliently pressed against the inner end of the pin 14 so as to frictionally pull the two elements 10 and 11 together and also to press the pin 14 against the wall of socket 23E.

Thus, when the two elements 10 and 11 are assembled, an electrical connection is automatically established between the contact pin 14 and the contact pin 16 through a path which includes: the contact pin 14, the socket 23E, the strip 23A, the cylindrical portion 23F and the pin 16. Also, an energizing circuit for the lamp bulb 15 is automatically established, and such energizing circuit extends through the following path: from pin 14, the metallic spring 22, the battery 21, the lamp bulb 15, spring clip 23B, strip 23A, socket 23E and pin 14. This circuit is represented also in Figure 9.

Thus, when the elements 10 and 11 are assembled, the probe 16 is fully effective for measurements, and the general vicinity of the end of probe 16 is illuminated; and when the elements 10 and 11 are disassembled, as illustrated in Figure 1, the lamp bulb 15 is deenergized and the life of the battery 21 is preserved.

It is thus noted that the particular construction of the spring 22 and its relationship with respect to the other elements provides a simple and inexpensive jack construction for completing two electrical circuits.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A probe comprising a generally tubular member, a contact pin carried on one end of said member, a light source mounted in said member and arranged to illuminate the general vicinity of said contact pin, a socket mounted on the other end of said member arranged to receive a second contact pin, and means effective upon placement of said second pin in said socket for energizing said source and establishing an electrical connection between the first-mentioned pin and said second pin.

2. A probe comprising an insulated barrel, an insulated plug at one end of said barrel, a contact pin extending through said plug, a conducting strip in said barrel and extending substantially the full length thereof, one end of said strip being an electrical contact with said pin, a lamp bulb, a metallic clip mounted on said strip and mechanically and electrically connected to one terminal of said lamp bulb, said plug having an apertured portion through which light from said light bulb may pass in the general direction of said pin, a battery in said barrel having one terminal thereof connected electrically to the other contact of said lamp bulb, clip means mounted on said strip and releasably securing said battery in position, a socket formed on the other end of said strip and extending through an apertured portion in one end of said barrel, an insulated ferrule mounted on the other end of said strip, said ferrule having an annular internal shoulder, a metallic washer on said shoulder, a coil compression spring having one of its ends bearing against said washer and the other one of its ends bearing against said washer and the other one of its ends bearing against the other contact of said battery, said spring having its end adjacent said washer provided with a generally radially extending portion which overlies the apertured portion of said washer, said spring being metallic and having said end thereof adapted to resiliently contact a pin in circuit through said socket, said socket being of conducting material.

3. A probe as set forth in claim 2 in which an insulated sleeve is mounted on said plug and insulates a substantial length of the first-mentioned contact pin.

4. A probe comprising an elongated member having a contact pin mounted on one end thereof, illuminating means on said probe for illuminating the general vicinity of said contact pin, a socket for receiving a second contact pin in the other end of said member and means automatically effective upon insertion of said second pin in said socket for establishing an electrical connection between the first-mentioned pin and said second pin and for energizing said illuminating means.

5. A probe comprising an elongated member having a contact pin mounted on one end thereof, a contact strip in said member and extending substantially the full length of said member, said contact strip being connected electrically to said pin, a light bulb, a battery, means on said strip for releasably securing said lamp bulb and said battery within said member, an electrically conducting socket in the other end of said member and electrically connected to said strip, and spring means in said member for engaging a contact pin inserted in said socket for pressing the last-mentioned pin into engagement with said socket and for establishing an electrical circuit through said bulb and said battery.

6. A probe comprising an elongated member having an open end, a plug releasably secured in said one end, said plug having two apertured portions, a contact pin extending through one of said apertured portions, a conducting strip in said member and extending substantially the full length thereof, one end of said strip being electrically connected to said contact pin, a lamp bulb mounted adjacent the other apertured portion in said plug for illuminating the general vicinity of the end of said contact pin, means on said strip for releasably securing said bulb on said strip in electrically conducting relationship, a battery in said member, means on said strip for releasably securing said battery on said strip, an insulated ferrule, a generally tubular conducting socket in the form of a rivet extending through an apertured portion in the other end of said member and securing said ferrule to said strip, said socket being electrically connected to said strip, said ferrule being provided with an internal annular shoulder, a washer on said shoulder, a coil compression spring having one of its ends bearing against a contact of said battery with the other end of said spring bearing against said washer, said spring having the end thereof which is adjacent said washer provided with a generally radially extending portion which overlies the apertured portion in said washer.

7. A probe as set forth in claim 6 in which an insulated sleeve surrounds a substantial portion of said contact pin and is secured to said plug.

8. A probe comprising an elongated member, a contact pin mounted on one end of the member, a socket on the other end of said member and electrically connected to said pin, a light source, a battery, said light source and battery being mounted in said member in a series circuit, one terminal of said series circuit being connected to said contact pin, the other terminal of said series circuit being normally disconnected, and means effective upon insertion of a pin in said socket for connecting said other terminal of said series circuit to said socket.

References Cited in the file of this patent

UNITED STATES PATENTS

| | | |
|---|---|---|
| 2,231,660 | Carlotti | Feb. 11, 1941 |
| 2,413,484 | Berger | Dec. 31, 1946 |
| 2,540,402 | Mosier | Feb. 6, 1951 |